United States Patent [19]

Heider

[11] 4,244,900

[45] Jan. 13, 1981

[54] METHOD FOR THE CONTINUOUS PRODUCTION OF A CO-EXTRUDED HEAT-SHRINKABLE COMPOSITE FOAMED RESIN SHEET

[75] Inventor: James E. Heider, Toledo, Ohio

[73] Assignee: Owens-Illinois, Inc., Toledo, Ohio

[21] Appl. No.: 24,237

[22] Filed: Mar. 26, 1979

[51] Int. Cl.$^3$ .................... B29D 27/00; B29C 17/02
[52] U.S. Cl. .................. 264/46.1; 264/210.7; 264/230
[58] Field of Search ............ 264/45.9, 46.1, 210.7, 264/230

[56] References Cited

U.S. PATENT DOCUMENTS

| | | | |
|---|---|---|---|
| 2,778,057 | 1/1957 | Clark | 264/288 |
| 3,076,232 | 2/1963 | Dengler | 264/DIG. 73 |
| 3,536,797 | 10/1970 | Cowan et al. | 264/48 X |
| 3,558,764 | 1/1971 | Isaacson et al. | 264/41 X |
| 3,855,376 | 12/1974 | Ono et al. | 264/46.1 |
| 4,038,446 | 7/1977 | Rhoads | 264/45.9 X |
| 4,071,597 | 1/1978 | Karabedian | 264/45.9 X |

FOREIGN PATENT DOCUMENTS 954069   4/1964   United Kingdom .................. 264/45.9

OTHER PUBLICATIONS

Pearson, J. R. A. "Mechanical Principles of Polymer Melt Processing", New York, Pergamon Press, ©1966, pp. 123-126.

*Primary Examiner*—Philip Anderson
*Attorney, Agent, or Firm*—E. J. Holler; M. E. Click; D. H. Wilson

[57] ABSTRACT

This invention relates to the treatment of plastic sheet material and especially co-extruded sheet of orientable plastic material which is comprised of film and foam layers which are continuously stretched in a longitudinal direction. The stretching is effected between a pair of rolls which are maintained at different temperatures and rotated at different rates of rotation to effect a cold stretching of the film-foam laminate to improve its shrink capability and lower its shrink temperature upon usage in various packaging applications. A preferred material is polyethylene which is co-extruded into a laminate of film and foam layers and which exhibits improved shrinkage characteristics when employed in the form of tubular sleeves for container labels or bands.

7 Claims, 3 Drawing Figures

METHOD FOR THE CONTINUOUS PRODUCTION OF A CO-EXTRUDED HEAT-SHRINKABLE COMPOSITE FOAMED RESIN SHEET

BACKGROUND OF THE INVENTION

This invention relates to the treatment of plastic sheet and, more specifically, to the treatment of a co-extruded layer or sheet of orientable plastic film comprised of foam and film layers which are continuously stretched.

1. Field of the Invention

The physical properties of certain plastic materials are significantly improved by cold-stretching the material to impart a mechanical stress thereto. Filaments of crystalline-type plastic materials such as nylon, saran, polyethylene, and the like, are commonly cold stretched by amounts up to 400% or more after extrusion. Such treatment has frequently been found to increase tensile strength of the filament by as much as eight to ten times. Similar increases in physical properties have also been attained in cold stretching sheet or film to improve the mechanical stress.

Continuous stretching of the sheet in the longitudinal direction alone has been found to impart highly directional properties to the sheets which in many applications of use may be found undesirable. When sheets are cold stretched in the longitudinal direction, the tensile strength will ordinarily be increased by amounts of 400% or more, as in the case of filaments, but will remain constant or only slightly increased in the transverse direction. In some processes, in order to remedy the difficulty of directional properties, sheets have been stretched laterally as well as longitudinally.

In the case of lateral stretching of a continuously-moving sheet, problems are encountered in continuously gripping the edges of the sheet while it is moved forwardly in a longitudinal direction. Pairs of diverging conveyor belts have been used to grasp the sheet edges in order to stretch it laterally. Proper gripping of the sheet edges has been difficult to achieve so that frequently non-uniform stretching is imparted to the sheet, resulting in wrinkling and uneven stressing. Such sheet edges at spaced points have also exhibited puckering or wrinkling of the sheet.

2. Description of the Prior Art

U.S. Pat. No. 3,536,797 to Cowan et al discloses a method for extruding a foamed polyolefin having a high gloss surface finish. The foamed molten film is quenched, heated to the orientation temperature of the thermoplastic on a smooth uniform heating surface, and then stretched along its longitudinal axis in heated condition to impart the desired orientation.

U.S. Pat. No. 3,076,232 to Dengler relates to a process for orienting ethylene film by stretching in a lengthwise direction at a temperature just below the melting temperature of the film, and then subjecting the film to a second stretching step at a higher temperature than the first stretching step but below the film melting temperature.

U.S. Pat. No. 3,558,764 to Isaacson et al discloses a process for preparing a microporous film wherein the film is cold drawn at ambient or near-ambient temperature and heat set.

U.S. Pat. No. 3,422,172 to Dekher discloses a process for removing corrugation from the surfaces of a plastic foam sheet as formed by slightly stretching the surfaces in a longitudinal direction.

U.S. Pat. No. 2,778,057 to Clark discloses method and apparatus for continuously stretching plastic film in a lateral direction using two pairs of rollers disposed on opposite sides of the sheet to grip the sheet as it is moved forwardly in a lengthwise direction.

SUMMARY OF THE INVENTION

The present invention avoids the difficulties of the prior art and solves the problem of continuously stretching co-extruded film and foam sheet in a longitudinal direction to impart both thermally and mechanically induced stresses into the laminated sheet. Such sheet is one which is normally made by extrusion of a film which is laminated to a simultaneously-extruded layer of foam of similar or nearly-similar materials, such as polyethylene, having like properties except for being solid and foamed, respectively.

A primary object of this invention is to provide a method of continuously producing a heat-shrinkable oriented film and foam thermoplastic sheet material which both lowers the shrink temperature of the material and provides greater shrink capabilities.

Another object of this invention is to provide a method for lengthwise stretching of an integral plastic sheet or film which is comprised of a solid film layer and a foamed layer, which will provide greater overall contracted dimensions in use when applied to containers such as glass or plastic bottles as labels or tamper-proof bands.

Another object of the invention is to provide a method of stretching co-extruded plastic sheet or film in a longitudinal direction to maintain the individual properties of film and foam layers while imparting a greater mechanical stress to the material which can be relieved upon heat shrinkage.

A still further object of the invention is to provide a method for imparting a lengthwise stretch to plastic co-extruded film-foam laminated sheet to reduce its thickness and provide improved shrinkage properties upon heat shrinkage.

Further objects and advantages will be more fully apparent from the following description of a preferred embodiment of the invention, reference being made to the accompanying drawings.

DESCRIPTION OF THE PREFERRED EMBODIMENT

Figure 1:
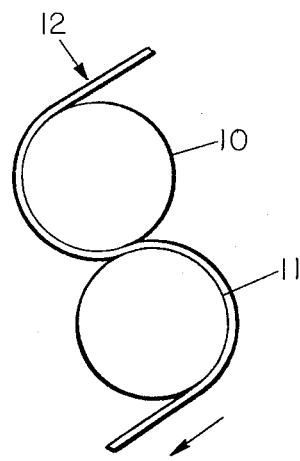
FIG. 1 is an elevational view of one form of apparatus for practicing the present process.

A preferred form of the invention comprises a pair of rollers, indicated by the numerals 10 and 11, which are aligned to impart a longitudinal stretch to the sheet 12 of thermoplastic material as it is moved lengthwise in a direction indicated by the arrow in FIG. 1. The plastic sheet consisting of film and foam layers integrally joined in a single sheet may be delivered from any supply source. The sheet is delivered to the stretching unit by suitable driving rollers. The sheet or film is preferably comprised of a film layer 14 of polyethylene and a foam layer 15 of polyethylene laminated into a single integral sheet, although any other crystalline orientable thermoplastic material which is capable of being placed in initially oriented form or condition prior to the time it reaches the pair of rollers 10 and 11 may be employed.

Figure 2:
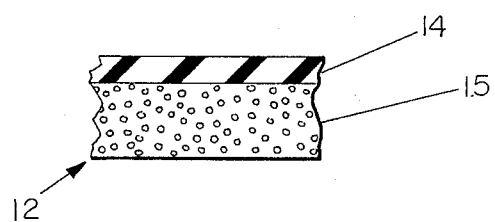
FIG. 2 is an enlarged sectional view of the laminated sheet material.
Figure 3:
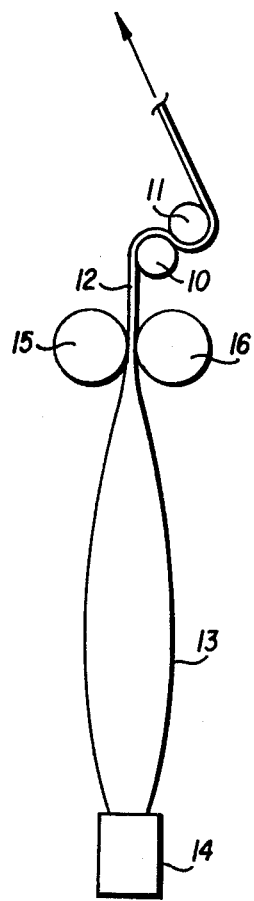
FIG. 3 is an elevational view showing the apparatus of FIG. 1 arranged for use with a laminated plastic sheet coextrusion and blowing apparatus.

The sheet of polyethylene material having a film layer 14 and a foam layer 15 has a cross-sectional structure as shown in FIG. 2. The sheet material is normally biaxially oriented in its forming process when made by co-extrusion and then blown and stretched both longitudinally and transversely. The sheet may be taken immediately after formation to the pair of rollers 10 and 11 as a single thickness of laminated material as illustrated in FIG. 3 or rolled into a stock roll which may be later taken to the secondary stretching as illustrated in FIG. 2. The laminated film-foam sheet may be comprised of single sheet thickness, or double sheet thickness, such as where the tubular blown sheet 13 from an extruder 14 is collapsed into flat form by a pair of collapsing rolls 15 and 16. In that case, the double sheet is passed between a pair of heating rolls which are similarly heated rather than a single heated roll as described hereinafter.

Where a single sheet thickness of the material is to be stretched, the rollers 10 and 11 are arranged in parallel closely-spaced alignment to permit continuous stretching of the sheet as it is passed therebetween. The rollers have similar cylindrical contours and smooth surfaces, and are preferably mounted in tandem approximately 15 to 20 mils apart, as measured center to center. The rollers 10 and 11 are driven at different rates of rotation to exert a pulling force on the sheet while traveling through the short distance between the rolls. The rollers 10 and 11 may be driven at rates of rotation of 50 rpm and 100 rpm, respectively for example, to effect a dragging and stretching effect upon the sheet. The first roller 10 is maintained at higher temperature than the second roller 11 to effect a slight heating of the sheet. The sheet may also be preheated if desired just prior to its arrival at the pair of rollers 10 and 11. Such first roller is preferably maintained at a temperature of from about 140° F. to 150° F. while the second roller is maintained at room or ambient temperature. The sheet in the case of film-foam polyethylene may be stretched from about 12 mils to 6 mils while imparting a mechanical stress in a lengthwise direction to the laminated material. Some necking of the sheet can and does occur at its edges where stretched between the rollers. However, the close spacing between the rollers minimizes such neck-in. The sheet is normally lengthened by about 50% to 70% of its initially-stretched length by such secondary stretching. Greater lengthening can be achieved so long as the modulus of rupture of the material is not exceeded or closely approached.

The material is biaxially oriented as formed and when in secondarily-stretched condition is especially useful for application in heat-shrunken, final form on containers as labels or tamper-proofing bands, for example. The material is able to contract through substantially greater ranges of dimensions into tightly conforming relation with container surfaces. Also the material is able to be heat-shrunk at a lower temperature and more quickly than previously treated material. Thus, the material treated in accordance with the present invention exhibits greater total shrink capability for ready application to containers and other articles.

Various modifications may be resorted to within the spirit and scope of the appended claims.

I claim:

1. The method of continuously producing a heat-shrinkable oriented film and foam thermoplastic polyolefin sheet material comprising the steps of co-extruding a layer of film and a layer of foam of said thermoplastic polyolefin material in tubular form, initially stretching the said co-extruded sheet of film and foam thermoplastic material in both longitudinal and transverse directions immediately following its co-extrusion, as a first step; and secondarily stretching the said co-extruded sheet longitudinally by feeding said sheet between the closely spaced peripheral surfaces of a pair of rolls rotating at different peripheral surface speeds, as a subsequent second step; said second step being effected with the temperature of said sheet below the melt point temperature of the polyolefin material, said sheet being lengthened in the range of 50% to 70% of its initially-stretched length by such secondary stretching.

2. The method in accordance with claim 1, wherein the adjacent surfaces of said pair of rolls are spaced apart tangentially by a gap ranging from about 15 to 20 mils.

3. The method in accordance with claim 1, wherein one of said rolls is maintained at a temperature ranging from about 140° F. to 150° F. and the other roll is maintained at ambient temperature.

4. The method in accordance with claim 1, wherein said co-extruded film and foam sheet is secondarily stretched to reduce its thickness from about 12 mils to about 6 mils to lower the shrink temperature of the material and provide greater total shrink capability.

5. The method in accordance with claim 1, wherein said pair of rolls have similar cylindrical contours and are operated at different rates of rotation having a ratio of about 2 to 1.

6. The method in accordance with claim 1, wherein said co-extruded film and foam sheet is mechanically stressed by said secondary stretching operation to provide greater contraction upon heat shrinkage of said sheet around a rigid article.

7. The method in accordance with claim 1, wherein said co-extruded film and foam sheet is comprised of polyethylene, the film surface having high gloss and smoothness to facilitate its decoration.

* * * * *